(12) United States Patent
Ostermann et al.

(10) Patent No.: US 7,203,648 B1
(45) Date of Patent: Apr. 10, 2007

(54) METHOD FOR SENDING MULTI-MEDIA MESSAGES WITH CUSTOMIZED AUDIO

(75) Inventors: Joern Ostermann, Morganville, NJ (US); Mehmet Reha Civanlar, Middletown, NJ (US); Barbara Buda, Morristown, NJ (US); Claudio Lande, Turin (IT)

(73) Assignee: AT&T Corp., New York, NY (US)

( * ) Notice: Subject to any disclaimer, the term of this patent is extended or adjusted under 35 U.S.C. 154(b) by 544 days.

(21) Appl. No.: 10/003,094

(22) Filed: Nov. 2, 2001

Related U.S. Application Data

(60) Provisional application No. 60/245,521, filed on Nov. 3, 2000.

(51) Int. Cl.
G10L 21/00 (2006.01)
(52) U.S. Cl. .............. 704/260; 704/270; 704/275
(58) Field of Classification Search ............. 704/235, 704/260, 270, 275; 379/88
See application file for complete search history.

(56) References Cited

U.S. PATENT DOCUMENTS

| | | |
|---|---|---|
| 4,276,570 A | 6/1981 | Burson et al. |
| 4,602,280 A | 7/1986 | Maloomian |
| 5,113,493 A | 5/1992 | Crosby |
| 5,347,306 A | 9/1994 | Nitta |
| 5,387,178 A | 2/1995 | Moses |
| 5,420,801 A | 5/1995 | Dockter et al. |
| 5,537,662 A | 7/1996 | Sato et al. |
| 5,546,500 A | 8/1996 | Lyberg |
| 5,555,343 A | 9/1996 | Luther |
| 5,555,426 A | 9/1996 | Johnson et al. |
| 5,638,502 A | 6/1997 | Murata |
| 5,640,590 A | 6/1997 | Luther |
| 5,647,834 A | 7/1997 | Ron |
| 5,657,426 A | 8/1997 | Waters et al. |
| 5,680,481 A | 10/1997 | Prasad et al. |
| 5,689,618 A | 11/1997 | Gasper et al. |
| 5,697,789 A | 12/1997 | Sameth et al. |
| 5,732,232 A | 3/1998 | Brush et al. |
| 5,745,360 A | 4/1998 | Leone et al. |
| 5,781,186 A | 7/1998 | Jennings |
| 5,818,461 A | 10/1998 | Rouet et al. |
| 5,826,234 A | 10/1998 | Lyberg |
| 5,850,463 A | 12/1998 | Horii |
| 5,852,669 A | 12/1998 | Eleftheriadis et al. |

(Continued)

OTHER PUBLICATIONS

"Photo-realistic Talking-heads From Image Samples," by E. Cosatto and H. P. Graf, IEEE Transactions on Multimedia, Sep. 2000, vol. 2, issue 3, pp. 152-163.

(Continued)

*Primary Examiner*—Abul K. Azad

(57) ABSTRACT

A system and method of creating a customized multi-media message to a recipient is disclosed. The multi-media message is created by a sender and contains an animated entity that delivers an audible message. The sender chooses the animated entity from a plurality of animated entities. The system receives a text message from the sender and receives a sender audio message associated with the text message. The sender audio message is associated with the chosen animated entity to create the multi-media message. The multi-media message is delivered by the animated entity using as the voice the sender audio message wherein the mouth movements of the animated entity conform to the sender audio message.

15 Claims, 6 Drawing Sheets

U.S. PATENT DOCUMENTS

| | | | |
|---|---|---|---|
| 5,857,099 A * | 1/1999 | Mitchell et al. | 704/235 |
| 5,860,064 A | 1/1999 | Henton | |
| 5,880,731 A | 3/1999 | Liles et al. | |
| 5,889,892 A | 3/1999 | Saito | |
| 5,936,628 A | 8/1999 | Kitamura et al. | |
| 5,950,163 A | 9/1999 | Matsumoto | |
| 5,963,217 A | 10/1999 | Grayson | |
| 5,970,453 A | 10/1999 | Sharman | |
| 5,982,853 A * | 11/1999 | Liebermann | 379/52 |
| 5,983,190 A | 11/1999 | Trower et al. | |
| 5,995,119 A | 11/1999 | Cosatto et al. | |
| 5,995,639 A | 11/1999 | Kado et al. | |
| 6,002,997 A | 12/1999 | Tou | |
| 6,011,537 A | 1/2000 | Slotznick | |
| 6,018,744 A | 1/2000 | Mamiya et al. | |
| 6,064,383 A | 5/2000 | Skelly | |
| 6,078,700 A | 6/2000 | Sarachik | |
| 6,122,177 A | 9/2000 | Kitano | |
| 6,122,606 A | 9/2000 | Johnson | |
| 6,147,692 A | 11/2000 | Shaw et al. | |
| 6,161,082 A | 12/2000 | Goldberg et al. | |
| 6,173,250 B1 | 1/2001 | Jong | |
| 6,195,631 B1 | 2/2001 | Alshawi et al. | |
| 6,215,505 B1 | 4/2001 | Minami et al. | |
| 6,219,638 B1 * | 4/2001 | Padmanabhan et al. | 704/235 |
| 6,230,111 B1 | 5/2001 | Mizokawa | |
| 6,232,966 B1 | 5/2001 | Kurlander | |
| 6,233,544 B1 | 5/2001 | Alshawi | |
| 6,243,681 B1 | 6/2001 | Guji et al. | |
| 6,289,085 B1 * | 9/2001 | Miyashita et al. | 379/88.02 |
| 6,332,038 B1 | 12/2001 | Funayama et al. | |
| 6,377,925 B1 * | 4/2002 | Greene et al. | 704/271 |
| 6,381,346 B1 | 4/2002 | Erasian | |
| 6,384,829 B1 | 5/2002 | Prevost et al. | |
| 6,385,586 B1 | 5/2002 | Dietz | |
| 6,393,107 B1 * | 5/2002 | Ball et al. | 379/88.13 |
| 6,405,225 B1 | 6/2002 | Apfel et al. | |
| 6,417,853 B1 | 7/2002 | Squires et al. | |
| 6,453,294 B1 | 9/2002 | Dutta et al. | |
| 6,460,075 B2 | 10/2002 | Kruger et al. | |
| 6,466,213 B2 | 10/2002 | Bickmore et al. | |
| 6,476,815 B1 | 11/2002 | Ando | |
| 6,496,868 B2 | 12/2002 | Krueger et al. | |
| 6,522,333 B1 | 2/2003 | Hatlelid et al. | |
| 6,532,011 B1 | 3/2003 | Francini et al. | |
| 6,539,354 B1 | 3/2003 | Sutton et al. | |
| 6,542,936 B1 | 4/2003 | Mayle et al. | |
| 6,545,682 B1 | 4/2003 | Ventrella et al. | |
| 6,553,341 B1 | 4/2003 | Mullaly et al. | |
| 6,631,399 B1 | 10/2003 | Stanczak et al. | |
| 6,643,385 B1 | 11/2003 | Bravomalo | |
| 6,665,860 B1 | 12/2003 | DeSantis et al. | |
| 6,680,934 B1 | 1/2004 | Cain | |
| 6,692,359 B1 | 2/2004 | Williams et al. | |
| 6,782,431 B1 | 8/2004 | Mukherjee et al. | |
| 6,784,901 B1 | 8/2004 | Harvey et al. | |
| 6,801,931 B1 | 10/2004 | Ramesh et al. | |
| 6,963,839 B1 * | 11/2005 | Ostermann et al. | 704/260 |
| 6,976,082 B1 * | 12/2005 | Ostermann et al. | 709/231 |
| 6,990,452 B1 * | 1/2006 | Ostermann et al. | 704/260 |
| 7,035,803 B1 * | 4/2006 | Ostermann et al. | 704/260 |
| 7,091,976 B1 * | 8/2006 | Ostermann et al. | 345/473 |
| 2001/0019330 A1 | 9/2001 | Bickmore et al. | |
| 2001/0049596 A1 | 12/2001 | Lavine et al. | |
| 2001/0050681 A1 | 12/2001 | Keys et al. | |
| 2001/0050689 A1 | 12/2001 | Park | |
| 2002/0007276 A1 * | 1/2002 | Rosenblatt et al. | 222/211 |
| 2002/0109680 A1 | 8/2002 | Orbanes et al. | |
| 2002/0194006 A1 | 12/2002 | Challapali | |
| 2003/0028378 A1 | 2/2003 | August et al. | |
| 2003/0035412 A1 | 2/2003 | Wang et al. | |
| 2003/0046160 A1 | 3/2003 | Paz-Pujalt et al. | |
| 2003/0191816 A1 | 10/2003 | Landress et al. | |
| 2004/0091154 A1 | 5/2004 | Cote | |
| 2004/0091156 A1 | 5/2004 | Cote | |
| 2005/0091305 A1 | 4/2005 | Lange et al. | |

OTHER PUBLICATIONS

"Audio-Visual Speech Modeling for Continuous Speech Recognition," IEEE Trans. on MultiMedia, vol. 2, No. 3, Sep. 2000.

TTS Based Very Low Bit Rate Speech Coder, by K-S. Lee and R. V. Cox, Proc. ICASSP 1999, vol. I, Mar. 1999, pp. 181-184.

"Emu: An E-mail Preprocessor for Text-to-Speech," by Richard Sproat, Jianying Hu, and Hao Chen, IEEE Signal Processing Society 1998 Workshop on Multimedia Signal Processing, Dec. 7-9, 1998, Los Angeles, CA, USA.

"Trends of ASR and TTS Applications in Japan," Proc. of International Workshop on Interactive Voice Technology for Telecommunications Applications (IVTTA96), Sep. 1996.

Decarlo et al,"An anthropometric face model using variational techniques", In Proc. of 25th Annl Conf. on Computer Graphics & interactive Tech.Siggraph 98, ACM Press, NY,67-74.

Jian-Gang Wang et al. "Morphology-based front-view facial contour detection", IEEE Int'l Conf on Systems, Man and Cybemetics, vol. 4, Oct. 2000, pp. 2775-2780.

Shinn-Yin Ho et al,"Facial modeling fr. an uncalibrated face image using flexible generic parameterized facial models", IEEE Trans. on Systems, Man, & Cybemitics, Pt B, V.31.

Noh, J. et al,"Expression cloning", In Proc.of 28th Annual Conf. on Computer Graphics and interactive Techniques, SIGGRAPH 01, ACM Press, NY, NY pp. 277-288.

Litwinowicz, et al "Animating images with drawings" Proc 21st Annual Conf. on Computer Graphics & interactive Tech. SIGGRAPH 1994, ACM Press, NY, NY 409-412.

Yoo, et al "Concept formation in numeric domains" Proc. 1995 ACM 23rd Annual Conf. on Computer Science, ACM Press, NY, NY, 36-41.

W. Keith Edwards, "The Design and Implementation of the Montage Multimedia Mail System", Apr. 1991, IEEE Conference Proceedings of Tricomm '91, pp. 47-57.

Ming Ouhyoung et al "Web-enable Speech Driven Facial Animation", Proc. of ICAT'99 (Int'l Conference on Artificial Reality and Tele-existance), pp. 23-28, Dec.'99, Tokyo, Japan.

H. Noot, ZS. M. Rutkay, Chartoon 20.0 Manual, Jan. 31, 2000.

Lijun Yin, A. Basu; "MPEG4 face modeling using fiducial points", IEEE; Image Processing, 1997. Proceedings., International Conference on, vol. 1, 26-29. 1997.

Bickmore, et al., "Animated Autonomous Personal Representatives", ACM, International Conference on Autonomous Agents, Proceedings of the Second International Conference on Autonomous Agents, pp. 8-15, 1998.

Thorisson, Kristinn R. "ToonFace: A System for Creating and Animating Interactive Cartoon Faces." MIT Media Laboratory Learning and Common Sense Section Technical Report, pp. 96-101, Apr. 1996.

David Kurlander, Tim Skelly, David Salesin, "Comic Chat", Proceedings of the 23rd Annual Conference on Computer Graphics and Interactive Techniques, Aug. 1996.

Pollack, "Happy in the East or Smiling in the West", New York Times. Aug. 12, 1996.

Pelachaud, et al. "Generating Facial Expressions for Speech", Cognitive Science, Jan. 3, 1996, vol. 20, No. 1, pp. 1-46.

* cited by examiner

METHOD FOR SENDING MULTI-MEDIA MESSAGES WITH CUSTOMIZED AUDIO

PRIORITY APPLICATION

The present application claims priority to U.S. Patent Application No. 60/245,521 filed Nov. 3, 2000, the contents of which are incorporated herein.

RELATED APPLICATIONS

The present application is related to the following U.S. patent applications: Ser. No. 10/003,091 entitled "System and Method for Receiving Multi-Media Messages"; Ser. No. 10/003,350 entitled "System and Method for Sending Multi-Media Messages Using Emoticons"; Ser. No. 10/003,093 entitled "System and Method for Sending Multi-Media Messages Using Customizable Background Images"; Ser. No. 10/003,092 entitled "System and Method of Customizing Animated Entities for Use in a Multi-Media Communication Application"; Ser. No. 09/999,526 entitled "System and Method of Controlling Sound in a Multi-Media Communication Application"; Ser. No. 09/999,525 entitled "System and Method of Marketing Using a Multi-Media Communication System"; and Ser. No. 09/999,505 entitled "System and Method of Providing Multi-Cultural Multi-Media Messages." These applications, filed concurrently herewith and commonly assigned, are incorporated herein by reference.

BACKGROUND OF THE INVENTION

1. Field of the Invention

The present invention relates to multi-media messages and more specifically to a system and method of customizing the audio portion of a multi-media message created by a sender.

2. Discussion of Related Art

There is a growing popularity for text-to-speech ("TTS") enabled systems that combine voice with a "talking head" or a computer-generated face that literally speaks to a person. Such systems improve user experience with a computer system by personalizing the exchange of information. Systems for converting text into speech are known in the art. For example, U.S. Pat. No. 6,173,263 B1 to Alistair Conkie, assigned to the assignee of the present invention, discloses a system and method of performing concatenative speech synthesis. The contents of this patent are incorporated herein by reference.

One example associated with the creation and delivery of e-mails using a TTS system is LifeFX™'s facemail™. FIG. 1 illustrates how a sender creates a message using the LifeFX™ system. A window 10 presents fields for inserting the sender's e-mail address 12 and the recipient's e-mail address 14. Standard features such as control buttons 16 for previewing and delivering the multi-media message are provided. A standard subject line is also provided 18. The sender chooses from a variety of faces 20 to deliver the message. The currently chosen face 22 appears in the window 10 as well. The sender inserts the message text as with a traditional e-mail in a text area 24 and a box 26 below the text area gives illustrations of some of the available emoticons, explained further below.

This system enables a sender to write an e-mail and choose a talking head or "face" to deliver the e-mail. The recipient of the e-mail needs to download special TTS software in order to enable the "face" to deliver the message. The downloaded software converts the typewritten e-mail from the e-mail sender into audible words, and synchronizes the head and mouth movements of the talking head to match the audibly spoken words. Various algorithms and software may be used to provide the TTS function as well as the synchronization of the speech with the talking head. For example, the article, "Photo-realistic Talking-heads From Image Samples," by E. Cosatto and H.P. Graf, *IEEE Transactions on Multimedia*, September 2000, Vol. 2, Issue 3, pages 152–163, describes a system for creating a realistic model of a head that can be animated and lip-synched from phonetic transcripts of text. The contents of this article are incorporated herein by reference. Such systems, when combined with TTS synthesizers, generate video animations of talking heads that resemble people. One drawback of related systems is that the synthesized voice bears no resemblance to the sender voice.

The LifeFX™ system presents the user with a plurality of faces 20 from which to choose. Once a face is chosen, the e-mail sender composes an e-mail message. Within the e-mail, the sender inserts features to increase the emotion showed by the computer-generated face when the e-mail is "read" to the e-mail recipient. For example, the following will result in the message being read with a smile at the end: "Hi how are you today?:-)". These indicators of emotion are called "emoticons" and may include such features as: :-((frown); -o (wow); :-x (kiss); and ;-) (wink). The e-mail sender will type in these symbols which are translated by the system into the emotions. Therefore, after composing a message, inserting emoticons, and choosing a face, the sender sends the message. The recipient will get an e-mail with a notification that he or she has received a facemail and that they will need to download a player to hear the message.

The LifeFX™ system presents its emoticons when delivering the message in a particular way. For example, when an emoticon such as a smile is inserted in the sentence "Hi, Jonathon, :-) how are you today?" the "taking head" 22 speaks the words "Hi, Jonathan" and then stops talking and begins the smiling operation. After finishing the smile, the talking head completes the sentence "how are you today?"

The LifeFX™ system only enables the recipient to hear the message after downloading the appropriate software. There are several disadvantages to delivering multi-media messages in this manner. Such software requires a large amount of disc space and the recipient may not desire to utilize his or her space with the necessary software. Further, with viruses prevalent on the Internet, many people are naturally reluctant to download software when they are unfamiliar with its source.

FIG. 2 illustrates a received facemail™ 40. The chosen talking head 22 delivers the message. Buttons such as "say again" 42, "new" 44, "forward" 26, "reply" 48, "reply all" 50, and "show text" 52 enable the recipient to control to some degree how the message is received. Buttons 42, 44, 46, 48 and 50 are commonly used button features for controlling messages. Button 52 allows the user to read the text of the message. When button 52 is clicked, the text of the message is shown in a window illustrated in FIG. 3. A separate window 54 pops up typically over the talking head 22 with the text.

SUMMARY OF THE INVENTION

What is needed in the art is a system and method to enable more creative and desirable control to a sender of a multi-media message. The present invention addresses the deficiencies in the prior art and focuses on systems and methods related to sender control of the creation of animated multi-media messages. Specifically, the present invention relates to enabling the sender to create multi-media messages with more control over the voice used to deliver the message. For example, the sender may record an audio message in his or her own voice and use that voice to deliver the message.

The present invention relates to a method of delivering a multi-media message to a recipient, the multi-media message being created by a sender and for delivery by an animated entity. The method comprises recording an audio message from the sender, receiving a choice of one of a plurality of animated entities to deliver the message, conforming the audio message to movements associated with the animated entity to create a multi-media message, and delivering the multi-media message to the recipient with the animated entity speaking the recorded audio message from the sender.

According to an aspect of the invention, conforming the audio message to movements associated with the animated entity may be accomplished in several ways. For example, an automatic speech recognition (ASR) system may convert the audio message into text for the sender to review. In this way, the movements of the animated entity may be created according to the text version of the message with the audio version being "spoken" simultaneously when the message is delivered to the recipient. In another version of the invention, the sender first submits a text version of the message via typing or the like and then reads the typed message to create an audio version of the message. When the multi-media message is delivered to the recipient, the audio portion of the multi-media message becomes the actual voice of the sender. The sender may also insert emoticons into the text to increase the effect and variety of the multi-media message with the sender's voice as the audio portion of the message.

BRIEF DESCRIPTION OF THE DRAWINGS

The foregoing advantages of the present invention will be apparent from the following detailed description of several embodiments of the invention with reference to the corresponding accompanying drawings, of which.

DETAILED DESCRIPTION OF THE INVENTION

The present invention may be best understood with reference to the accompanying drawings and description herein. The basic system design supporting the various embodiments of the invention is first disclosed. A system comprises a TTS and an animation server to provide a multi-media message service over the Internet wherein a sender can create a multi-media message presentation delivered audibly by an animated entity.

Figure 1:
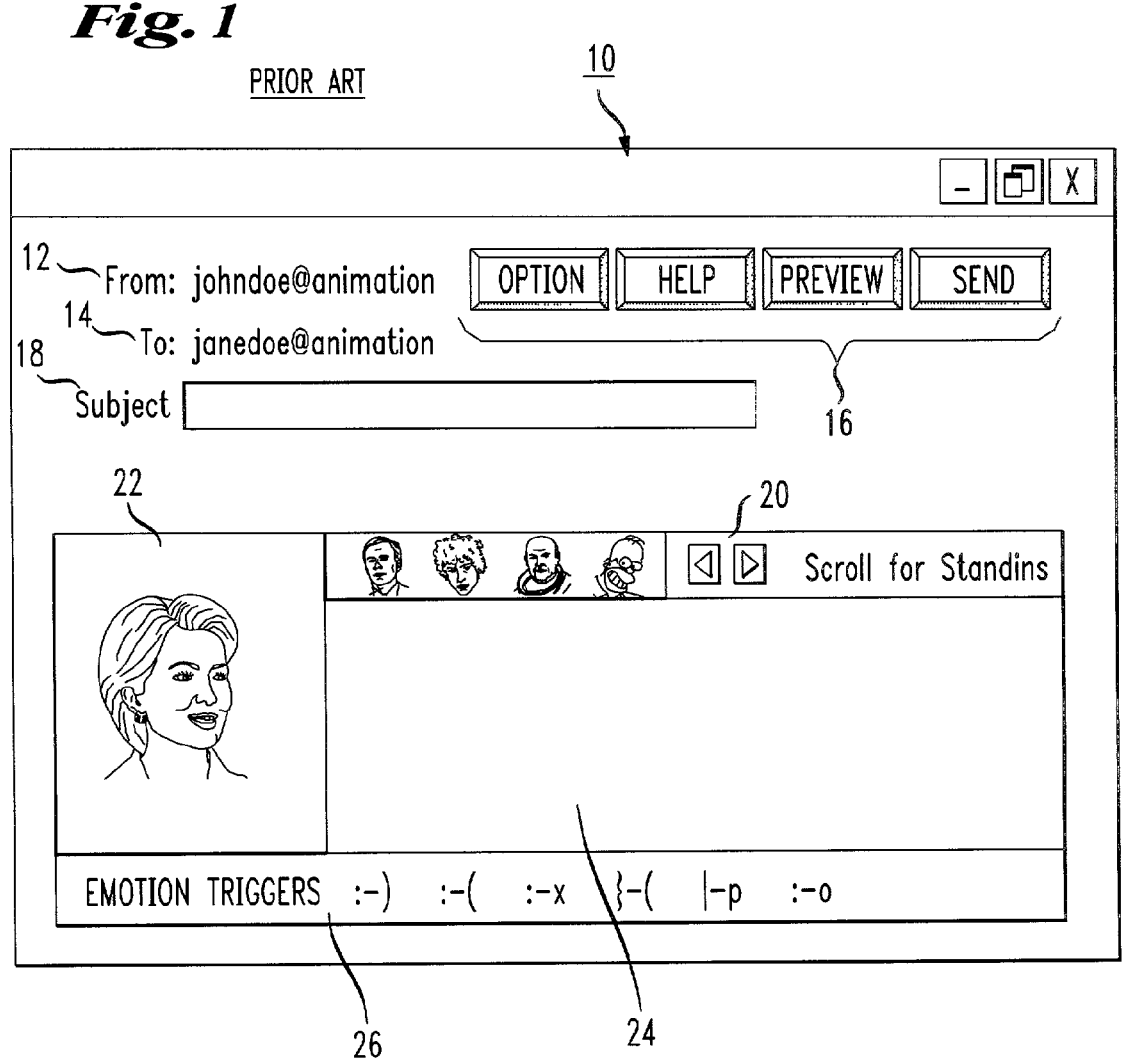
FIG. 1 illustrates a prior art window for creating a multi-media message.
Figure 2:
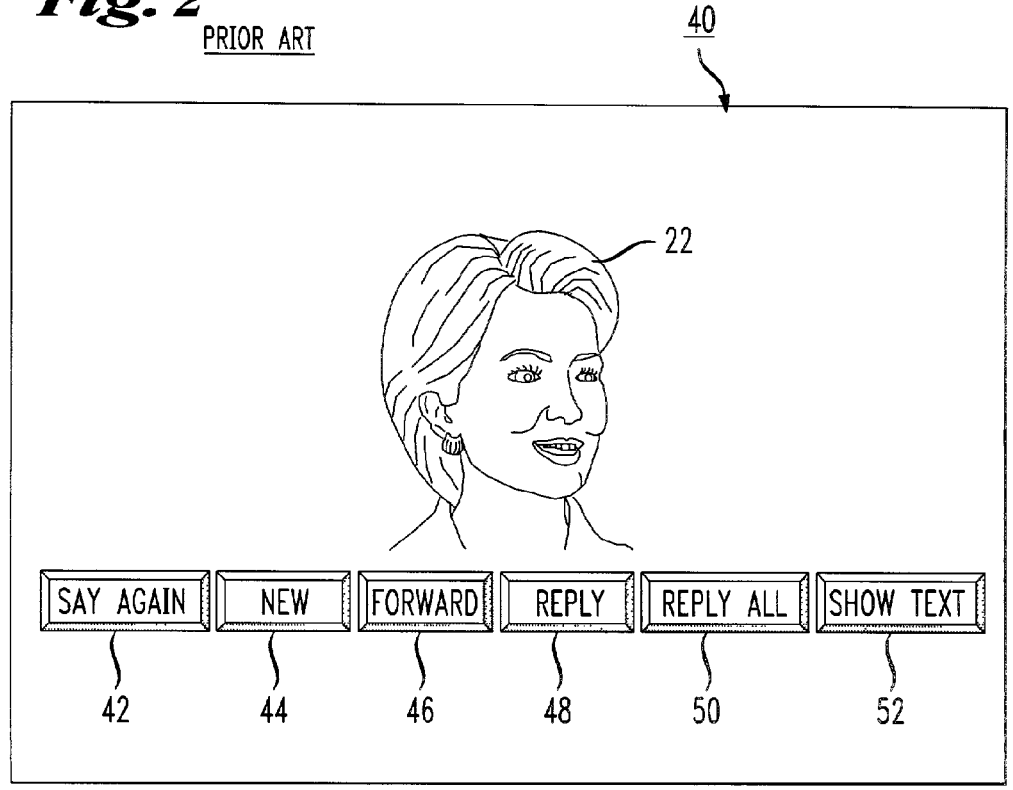
FIG. 2 illustrates a prior art window viewed by a recipient of a multi-media message.
Figure 3:
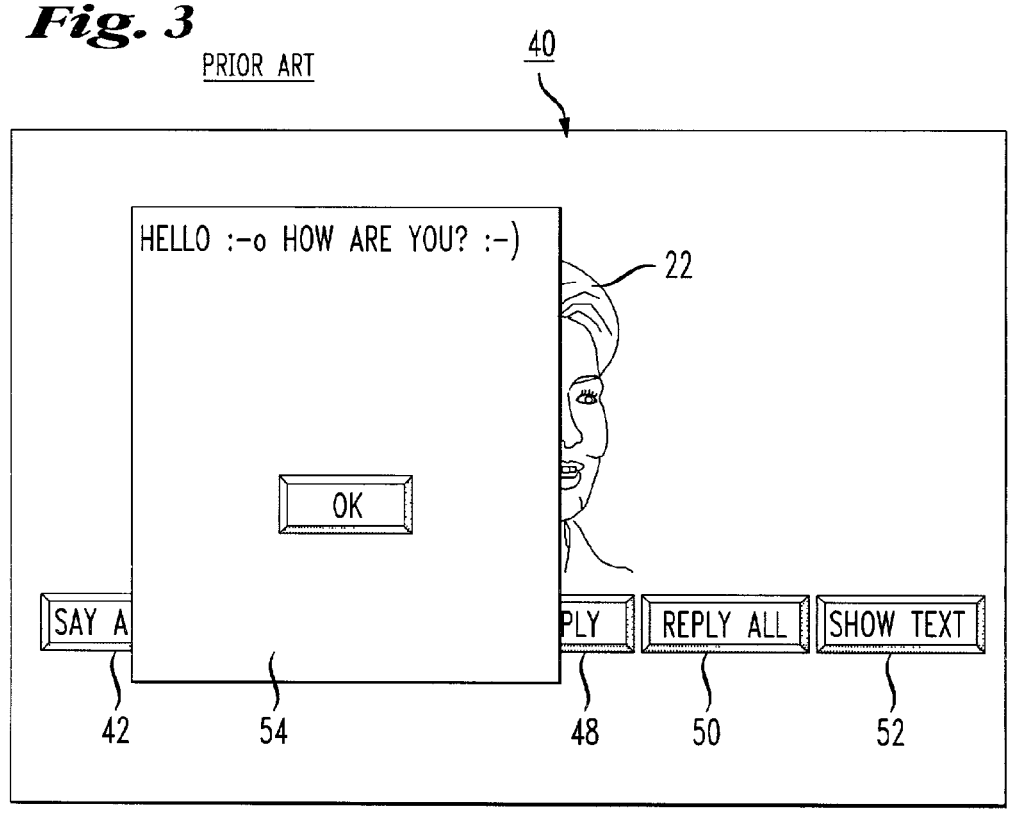
FIG. 3 illustrates a prior art window in response to a recipient of a multi-media message clicking on a "show text" button.
Figure 4A:
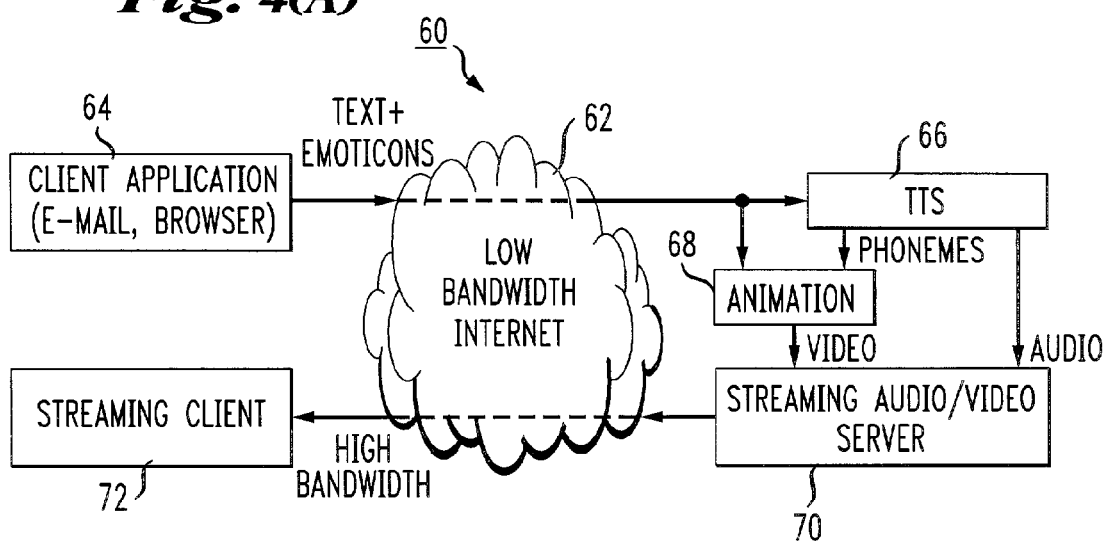
FIG. 4(a) illustrates the basic architecture of the system according to an embodiment of the present invention.

FIG. 4(a) illustrates a high-bandwidth architecture 60 associated with the embodiments of the invention. The system 60 delivers a hyper-text mark-up language (HTML) page through the Internet 62 (connected to a web server, not shown but embodied in the Internet 62) to a client application 64. The HTML page (shown by way of example in FIG. 6) enables the sender to create a multi-media message. The client application may be, for example, a web browser such as Microsoft's Internet Explorer®. Other client applications include e-mail and instant messaging clients. The sender creates the multi-media message using the HTML page.

The web server receives the composed multi-media message, which includes several components that are additional to a regular e-mail or instant message. For example, a multi-media message includes a designation of an animated entity for audibly delivering the message and emoticons that add emotional elements to the animated entity during the delivery of the message. The HTML page delivered to the client terminal enables the sender to manipulate various buttons and inputs to create the multi-media message.

Once the sender finishes creating the multi-media message and sends the message, the Internet 62 transmits the message text with emoticons and other chosen parameters to a text-to-speech ITS) server 66 that communicates with an animation or face server 68 to compute and synchronize the multi-media message. The transmission of the text-to-speech data may be accomplished using such methods as those disclosed in U.S. Pat. No. 6,173,250 B1 to Kenneth Jong, assigned to the assignee of the present invention. The contents of this patent are incorporated herein by reference.

The animation server 68 receives phonemes associated with the sender message and interpreted by the TTS server 66, including the text of the subject line and other text such as the name of the sender, as well as other defined parameters or data. The animation server 68 processes the received phonemes, message text, emoticons and any other provided parameters such as background images or audio and creates an animated message that matches the audio and the emoticons. An exemplary method for producing the animated entity is disclosed in U.S. Pat. No. 5,995,119 to Cosatto et al. ("Cosatto et al."). The Cosatto et al. patent is assigned to the assignee of the present invention and its contents are incorporated herein by reference. Cosatto et al. disclose a system and method of generating animated characters that can "speak" or "talk" received text messages. Another reference for information on generating animated sequences of animated entities is found in U.S. Pat. No. 6,122,177 to Cosatto et al. ("Cosatto et al. II"). The contents of Cosatto et al. II are incorporated herein by reference as well.

The system 60 encodes the audio and video portions of the multi-media message for streaming through a streaming audio/video server 70. In a high-bandwidth version of the present invention, as shown in FIG. 4(a), the server 70 streams the multi-media message to the streaming client 72 over the Internet 62. One of ordinary skill in the art will understand and be cognizant of a variety of TTS servers and TTS technologies that may be optimally used for converting the text to speech. The particular implementation of TTS technologies is not relevant to the present invention. One of ordinary skill in the art will understand and be cognizant of a variety of animation servers and animation technologies that may be optimally used for converting phonemes and emoticons into talking entities, preferably faces. The particular implementation of animation technologies is not relevant to the present invention.

Figure 4B:
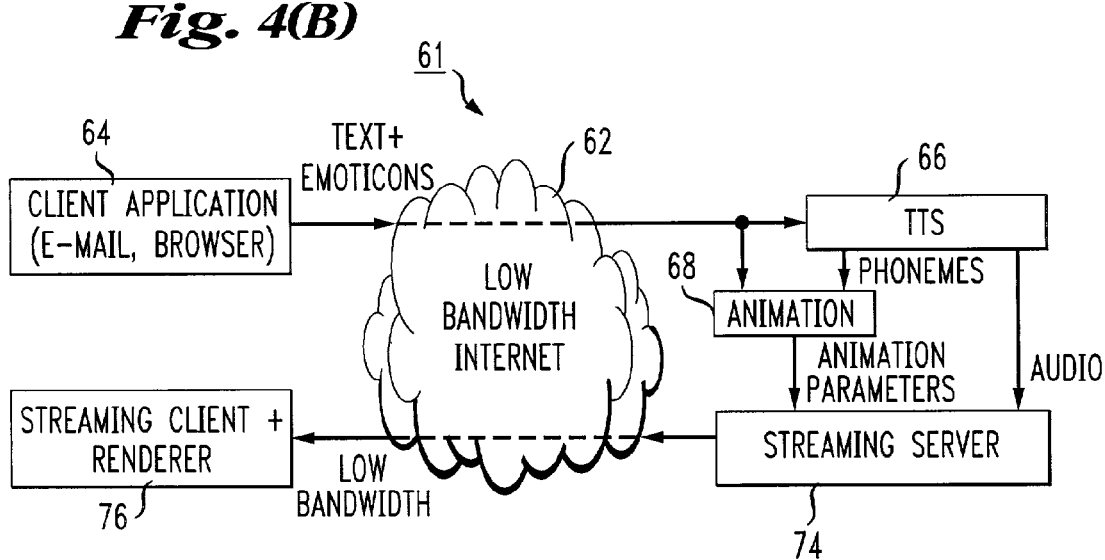
FIG. 4(b) illustrates a low-bandwidth version of the system shown in FIG. 4(a)

FIG. 4(b) illustrates a low-bandwidth system 61 of the present invention. In this variation, the animation server 68 produces animation parameters that are synchronized with the audio produced from the TTS server 66. The audio and animation parameters are encoded and transmitted by the streaming server 74 over a lower bandwidth connection over the Internet 62. The streaming client 76 in this aspect of the invention differs from the streaming client 72 of FIG. 4(a) in that client 76 includes rendering software for rendering the animation on the client device using the streamed animation parameters provided from the streaming server 74. Furthermore, the client includes a TTS synthesizer that synthesizes the audio. In this manner, the systems disclosed in FIGS. 4(a) and 4(b) provide both a high-bandwidth and a low-bandwidth option for all users.

A further variation of the invention applies when the client device includes the animation or rendering software. In this case, the client device 72, 76 can receive a multi-media message e-mail, with the message declared as a specific multipurpose Internet mail extension (MIME) type, and render the animation locally without requiring access to a central server or streaming server 70, 74. In one aspect of the invention, the rendering software includes a TTS synthesizer with the usable voices. In this case, the recipient device 72, 76 receives the text (very little data) and the face model (several kb), unless it is already stored in a cache at the receiver device 72, 76. If the receiver device 72, 76 is requested to synthesize a voice different from the ones available at its TTS synthesizer, the server 74 downloads the new voice.

High quality voices typically require several megabytes of disk space. Therefore, if the voice is stored on a streaming server 74, in order to avoid the delay of the huge download, the server 74 uses a TTS synthesizer to create the audio. Then, the server 74 streams the audio and related markup information such as phonemes, stress, word-boundaries, bookmarks with emoticons, and related timestamps to the recipient. The recipient device 76 locally renders the face model using the face model and the markup information and synchronously plays the audio streamed from the server.

Figure 5:
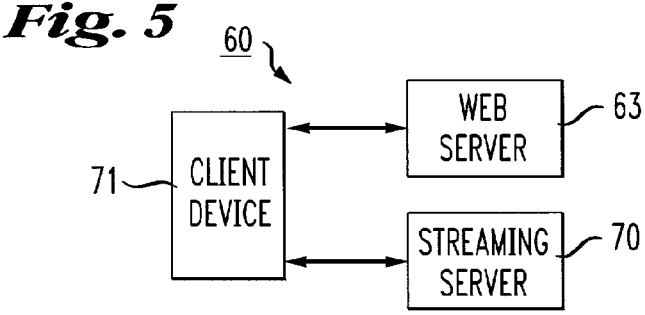
FIG. 5 shows example architecture for delivering the multi-media message.

When the recipient receives an e-mail message associated with the multi-media message, the message is received on a client device 71 such as that shown in FIG. 5. FIG. 5 illustrates a different view of system 60. The client device may be any one of a desktop, laptop computer, a wireless device such as a cell phone, 3Com's palmpilot® or personal data assistant and the like. The particular arrangement of the client device 71 is unimportant to the present invention. The multi-media message may be delivered over the Internet, via a wireless communication system such as a cellular communication system or via a satellite communication system.

The multi-media message delivery mechanism is also not limited to an e-mail system. For example, other popular forms of communication include instant messaging, bulletin boards, I Seek You (ICQ) and other messaging services. Instant messaging and the like differ from regular e-mail in that its primary focus is immediate end-user delivery. In this sense, the sender and recipient essentially become interchangeable because the messages are communicated back and forth in real time. Presence information for a user with an open session to a well-known multi-user system enables friends and colleagues to instantly communicate messages back and forth. Those of skill in the art know various architectures for simple instant messaging and presence awareness/notification. Since the particular embodiment of the instant message, bulletin board, or I Seek You (ICQ) or other messaging service is not relevant to the general principles of the present invention, no further details are provided here. Those of skill in the art will understand and be able to apply the principles disclosed herein to the particular communication application. Although the best mode and preferred embodiment of the invention relates to the e-mail context, the multi-media messages may be created and delivered via any messaging context.

For instant messaging, client sessions are established using a multicast group (more than 2 participants) or unicast (2 participants). As part of the session description, each participant specifies the animated entity representing him. Each participant loads the animated entity of the other participants. When a participant sends a message as described for the e-mail application, this message is sent to a central server that animates the entity for the other participants to view or streams appropriate parameters (audio/animation parameters or audio/video or text/animation parameters or just text) to the participants that their client software uses to render the animated entity.

Further as shown in FIG. 5, when a client device 71 receives a request from the recipient to view a multi-media message, the client device 71 sends a hypertext transfer protocol (HTTP) message to the web server 63. As a response, the web server sends a message with an appropriate MIME type pointing to the server 70 at which point the server 70 streams the multi-media message to the client terminal for viewing and listening. This operation is well known to those of skill in the art.

In an alternate aspect of the invention, the client device 71 stores previously downloaded specific rendering software for delivering multi-media messages. As discussed above, LifeFX™ requires the recipient to download its client software before the recipient may view the message. Therefore, some of the functionality of the present invention is applied in the context of the client terminal 71 containing the necessary software for delivering the multi-media message. In this case, the animation server 68 and TTS server 66 create and synchronize the multi-media message for delivery. The multi-media message is then transmitted, preferably via e-mail, to the recipient. When the recipient opens the e-mail, an animated entity shown in the message delivery window delivers the message. The local client software runs to locally deliver the message using the animated entity.

Many web-based applications require client devices to download software on their machines, such as with the LifeFX™ system. As mentioned above, problems exist with this requirement since customers in general are reluctant and rightfully suspicious about downloading software over the Internet because of the well-known security problems such as virus contamination, trojan horses, zombies, etc. New software installations often cause problems with the existing software or hardware on the client device. Further, many users do not have the expertise to run the installation process if it gets even slightly complicated e.g., asking about system properties, directories, etc. Further, downloading and installing software takes time. These negative considerations may prevent hesitant users from downloading the software and using the service.

Some Java-based applications are proposed as a solution for the above-mentioned problems but these are more restrictive due to security precautions and can't be used to implement all applications and there is no unified Java implementation. Therefore, users need to configure their browsers to allowJava-based program execution. As with the problems discussed above, a time-consuming download of the Java executable for each use by users who do not know if they really need or like to use the new application may prevent users from bothering with the Java-based software.

Accordingly, an aspect of the present invention includes using streaming video to demonstrate the use of a new software application. Enabling the user to preview the use of a new software application solves the above-mentioned problems for many applications. Currently, almost all client machines have a streaming video client such as Microsoft's Mediaplayer® or Real Player®. If not, such applications can be downloaded and configured with confidence. Note that the user needs to do this only once. These streaming video receivers can be used to receive and playback video on the client's machine.

According to this aspect of the present invention, shown by way of example in FIG. 5, a user may wish to preview a multi-media message before downloading rendering software on the client device 71. If such is the case, the user enters into a dialogue with the streaming server 70 and requests a preview or demonstration of the capabilities of the application if the rendering software were downloaded. The streaming server 70 transmits to the client device 71 a multi-media message showing dynamic screen shots of the application as if it is running on the user's machine. As an example, if the new application would have the capability to show a three-dimensional view of a room based on vector graphics, the streaming video displays the three-dimensional output of the application on the user's monitor as video. Most existing players allow the users to control the video playback by clicking on buttons or the like on an HTML page. This provides an interactive feeling for the user if needed without loading any new or suspicious software.

Therefore, an aspect of the present invention enables the user, before downloading rendering software for presenting multi-media messages using an animated entity, to request a preview of the multi-media message streamed to the client as a video and presented on a player such as the Microsoft Mediaplayer® or Real Player®. If the user so desires, he or she can then download the rendering software for enjoying the reception of multi-media messages.

Figure 6:
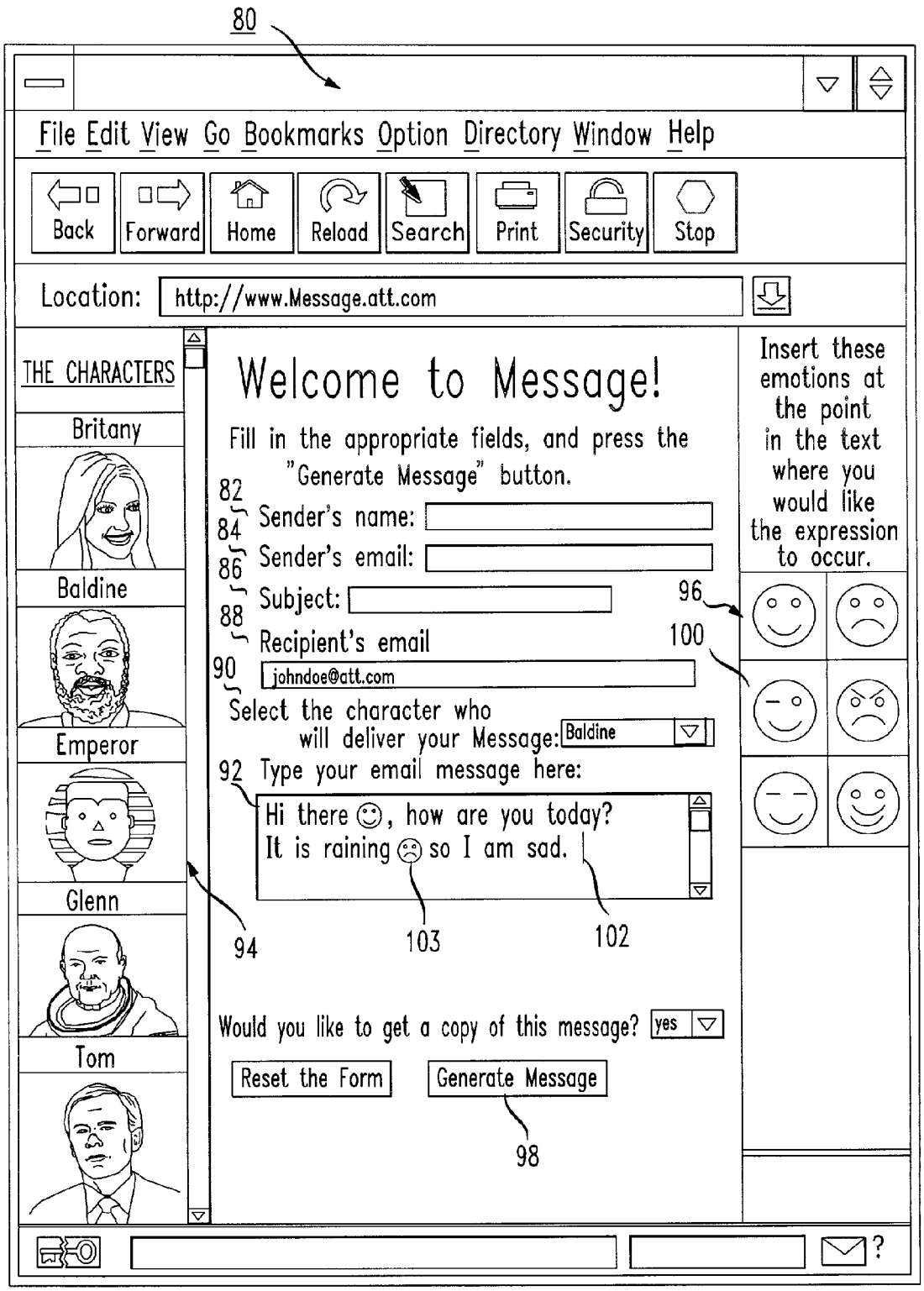
FIG. 6 illustrates an example multi-media message creation window with a configuration to enable a sender to choose options for creating a multi-media message.

FIG. 6 shows an example of a template for the sender to use to create a multi-media message. A message-creation window 80 includes basic e-mail-related features such as fields for inserting a sender name 82 and sender e-mail address 84. A subject line 86 and recipient address field 88 are also provided. The sender enters the text of the message within a standard text field 92. Various animated entities 94 are available from which the sender may choose 90 for delivering the message. Typically the animated entities are faces as shown in FIG. 6, but they may be any entity such as an animal, car, tree, robot, or anything that may be animated.

The sender may also insert emoticons 103 into the text of the message. The system includes predefined emoticons 96, such as ":-)" for a smile, "::-)" for a head nod, "*W*" for an eye wink, and so forth. The predefined emoticons are represented either as icons or as text, such as ";-)". As shown in FIG. 6, the window 80 includes a sample group of emoticon icons 96. The sender inserts an emoticon into a text message at the location of the cursor 102 by clicking on one of the emoticon icons 100. The sender may also type in the desired emoticon as text. Emoticon icons 96 save the sender from needing to type three keys, such as ":" and "-" and ")" for a smile. The icons 96 may be either a picture of, say, a winking eye or a icon representation of the characters ";-)" 100, or other information indicating to the sender that clicking on that emoticon icon will insert the associated emotion 103 into the text at the location of the cursor 102.

Once the sender composes the text of the message, chooses an animated entity 94, and inserts the desired emoticons 103, he or she generates the multi-media message by clicking on the generate message button 98. The animation server 68 creates an animated video of the selected animated entity 94 for audibly delivering the message. The TTS server 66 converts the text to speech as mentioned above. Emoticons 103 in the message are translated into their corresponding facial expressions such as smiles and nods. The position of an emoticon 103 in the text determines when the facial expression is executed during delivery of the message.

Execution of a particular expression preferably occurs before the specific location of the emoticon in the text. This is in contrast to the LifeFX™ system, discussed above, in which the execution of the smile emoticon in the text "Hello, Jonathan :-) how are you?" starts and ends between the words "Jonathan" and "how". In the present invention, the expression of the emoticon begins a predefined number of words or a predefined time before the emoticon's location in the text. Furthermore, the end of the expressions of an emoticon may be a predefined number of words after the location of the emoticon in the text or a predetermined amount of time after the location of the emoticon.

For example, according to an aspect of the present invention, the smile in the sentence "Hello, Jonathan :-) how are you?" will begin after the word "Hello" and continue through the word "how" or even through the entire sentence. The animated entity in this case will be smiling while delivering most of the message—which is more natural for the recipient than having the animated entity pause while executing an expression.

Furthermore, the starting and stopping points for executing expressions will vary depending on the expression. For example, a wink typically takes a very short amount of time to perform whereas a smile may last longer. Therefore, the starting and stopping points for a wink may be defined in terms of 0.1 seconds before its location in the text to 0.5 seconds after the location of the wink emoticon in the text. In contrast, the smile emoticon's starting, stopping, and duration parameters may be defined in terms of the words surrounding the emoticons.

Figure 7:
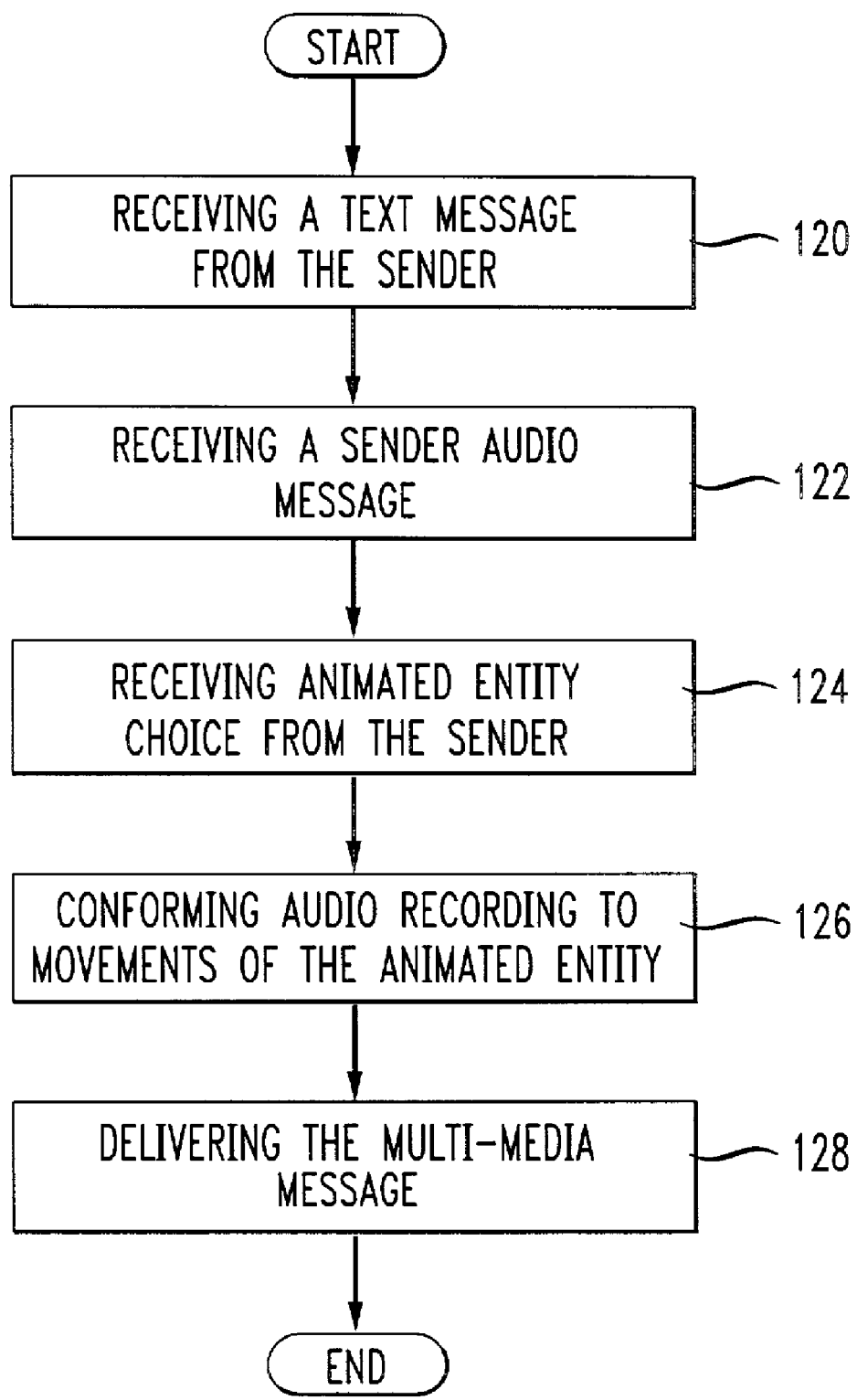
FIG. 7 illustrates an example method of providing a sender with an option to record an audio message to be delivered with an animated entity in a multi-media message.

According to another aspect of the invention, the audio portion of the animated multi-media message may not be drawn from TTS server 66 but from an audio recording from the sender. An example of this aspect of the invention is illustrated in FIG. 7. An exemplary method of creating and delivering a multi-media message comprises receiving a text message from the sender (120) and recording an audio message from the sender (122). Steps 120 and 122 may be performed in any order. If step 120 is accomplished first, then optimally the audio message corresponds to the text because the sender reads the typed message. The animation server 68 and the TTS server 66 coordinate the timing of the mouth movements of the selected animated entity (124) as it delivers the multi-media message (128). If the system first receives the sender audio message before the text of the message, the system may interpret the message using automatic speech recognition techniques (ASR) and provide the sender a text version of the message for review and approval. Basic speech recognition techniques are well known to those of skill in the art. The necessary software may reside on one of the servers shown in FIG. 4, such as the web server 63.

Having the sender's message converted to text for preview assures that the system correctly interpreted the audio message before conforming the movements of the animated entity to the audio message (126). Otherwise, an unnatural mouth movement by the animated entity in the multi-media message may accompany the audio message from the sender and reduce the effectiveness of the presentation. Therefore, if the audio message is received first, a text approval step is preferably performed by presenting the sender with a text window with a message asking whether this is the correct interpretation of the message and for the sender to edit the message accordingly. Once the sender approves the message, the system delivers the multi-media message to the recipient (128).

The audio message is preferably recorded via a microphone associated with the client device 71. In one aspect of the invention, a button or other means (not shown in FIG. 6) is presented to the sender in the window 80 providing the sender with an option to record a message that will be the audio portion of the multi-media message. If the sender chooses this option, and the system receives that choice, then an audio message input dialogue proceeds to walk the sender through prompts for the system to obtain and check the accuracy of an audio message for delivery. Various examples of this process are discussed below.

Either before or after recording the audio message, the method further comprises receiving a choice of one of a plurality of animated entities to deliver the message (124). Preferably, the means by which the sender chooses an animated entity is through the sender manipulating buttons or control elements such as a pull-down menu to choose the animated entity. The sender's choice is then received by the system for processing. There are a variety of different means that may be used to accomplish providing the sender with a plurality of animated entities from which to choose.

When a sender-recorded audio message is not used, as explained above, the TTS server 66 and animation server 68 coordinate to cause the mouth of the animated entity to move in a synchronized manner with the "speaking" of the message. In this manner, it appears as though the animated entity is talking. When the sound delivered in the multi-media message is the voice of the sender, then the mouth movements of the animated entity must still be synchronized to make it appear as though the animated entity is speaking the words. This is accomplished by time stamping the sender audio message, labeling the sender audio message with the sender text message using aligner software as it is used for TTS voice generation, and outputting the sender audio message with the appropriate video mouth movements for the animated entity. Cosatto et al. II disclose some of the details of how this may be done. Alternatively, software that detects mouth opening and closures from the audio waveform may be used. (See Pengyu Hong, Zhen Wen, Thomas Huang, "Real-time Speech Driven Avatar with Constant Short Time Delay," *International Conference on Augmented, Virtual Environments and* 3*D Imaging*, Greece, 2001 for background information regarding how to accomplish detecting mouth opening and closures from an audio waveform.) The multi-media message is then delivered to the recipient with the animated entity speaking the recorded audio message from the sender (128).

Figure 8:
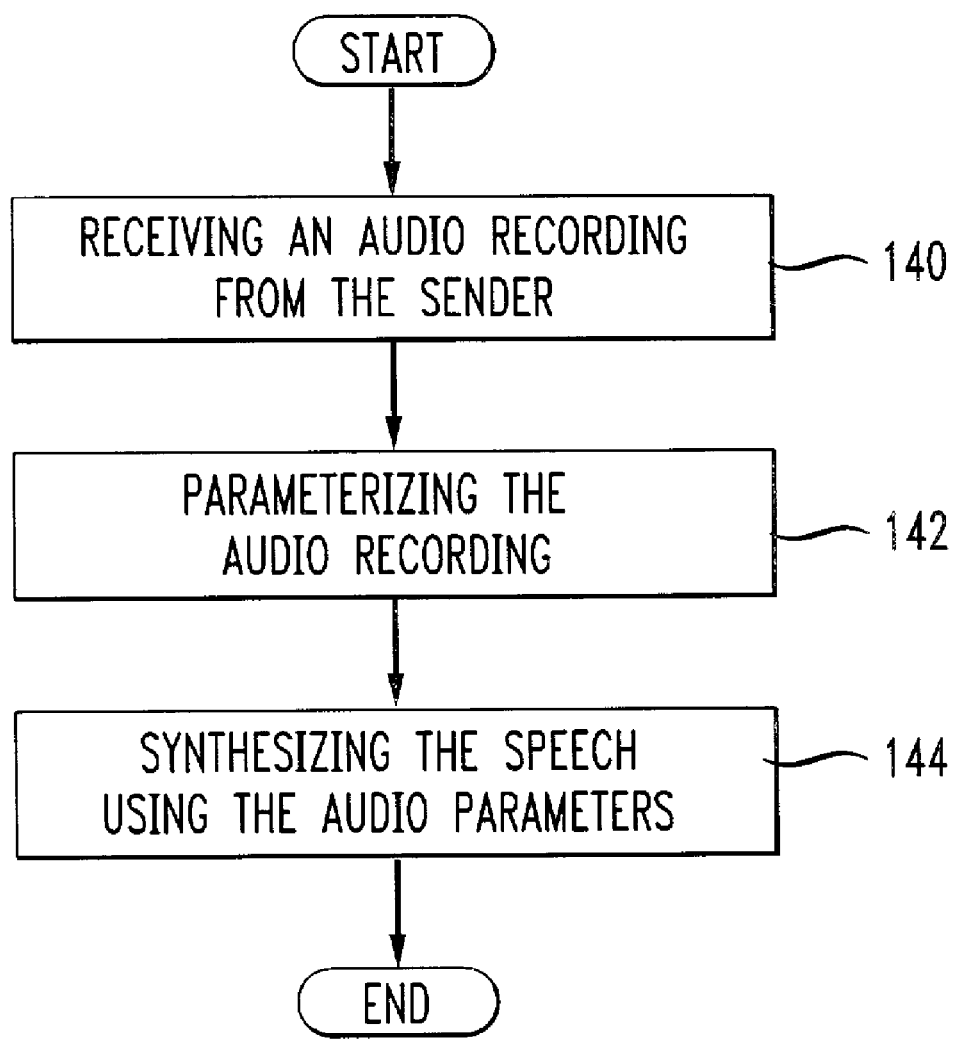
FIG. 8 illustrates an example method of providing a synthesized voice that is not the sender's voice but that includes sender voice characteristics.

Another variation of the present invention is illustrated in FIG. 8. In this case, the system presents the multi-media message using a synthesized voice that uses voice inflections and characteristics of the sender voice. To accomplish this, a method comprises receiving an audio recording from the sender (140). As discussed above relative to FIG. 7, receiving the audio recording from the sender may occur before or after the sender types or reviews a text version of the message. Therefore, the sender may first type the text and then read the text associated with step 140, or the sender may record the audio message and then receive a text version through ASR means and review and approve the text.

The next step involves parameterizing the audio recording (142). This step comprises using an alignment program to segment the audio recording into phonemes and label the audio recording with the phonemes, duration, pitch, stress and other parameters. These parameters and the text are fed into a speech synthesizer that then synthesizes the speech using its voice with the parameters derived from the recorded voice (144). The resulting synthesized voice in this example is not the voice of the sender but includes many of the characteristics of the sender voice, such as voice inflection, accent, pitch, rhythm, or a certain dialect. In this regard, the synthesized voice mimics the sender voice in one or more of the parameters analyzed from the recorded audio. (Background information regarding the technical details of how this may be accomplished are found in Lee, K-S. and Cox, R. V., "TTS based very low bit rate speech coder," *Proc. ICASSP '99*, Vol. I, March 1999, pp. 181–184.) In this manner, the synthesized voice will be more familiar and comfortable to the recipient and at least partially reflect the voice of the sender.

Although the above description may contain specific details, they should not be construed as limiting the claims in any way. Other configurations of the described embodiments of the invention are part of the scope of this invention. For example, any electronic communication between people where an animated entity can deliver the message is contemplated. E-mail and instant messaging have been specifically mentioned above, but other forms of communication are being developed such as broadband 3G and 4G wireless technologies wherein animated entities as generally described herein may apply. Accordingly, the appended claims and their legal equivalents should only define the invention, rather than any specific examples given.

We claim:

1. A method of delivering a multi-media message to a recipient, the multi-media message being created by a sender for delivery by an animated entity, the method comprising:
   recording an audio message from the sender;
   after recording the audio message from the sender, converting the audio message to a text message and presenting the text message to the sender;
   inserting at least one emoticon into the text message;
   receiving a choice of one of a plurality of animated entities to deliver the message;
   conforming the audio message to movements associated with the animated entity to create a multi-media message; and
   delivering the multi-media message to the recipient with the animated entity speaking the recorded audio message from the sender, wherein:
   when the animated entity delivers the multi-media message corresponding to the text message, the animated entity exhibits actions associated with a respective one of the at least one emoticon beginning at a point corresponding to a first predetermined amount of time before the respective one of the at least one emoticon and ending at a second point corresponding to a second predetermined amount of time after the respective one of the at least one emoticon, and the first predetermined amount of time and the second predetermined amount of time are defined based, at least partly, on words surrounding the respective one of the at least one emoticon.

2. The method of delivering a multi-media message to a recipient of claim 1, wherein the multi-media message is sent as an e-mail to the recipient.

3. The method of delivering a multi-media message to a recipient of claim 1, wherein the multi-media message is sent as an instant message to the recipient.

4. The method of delivering a multi-media message to a recipient of claim 1, wherein the multi-media message is sent over the Internet to the recipient.

5. The method of delivering a multi-media message to a recipient of claim 1, wherein the multi-media message is sent to the recipient via a wireless network.

6. The method of claim 1, wherein the first predetermined amount of time and the second predetermined amount of time are further defined based, at least partly, on the respective one of the at least one emoticon.

7. A method of sending a multi-media message from a sender to a recipient using an animated entity, the sender choosing the animated entity from a plurality of animated entities, the method comprising:

recording a sender audio message;

associating the sender audio message with the animated entity to create the multi-media message;

using an automatic speech recognition system to convert the audio message to a text message;

presenting the text message to the sender in textual form;

permitting the sender to insert at least one emoticon into the text message;

using the text message to coordinate mouth movements for the animated entity; and processing the multi-media message for the recipient such that the animated entity speaks the sender audio message, wherein:

when the animated entity speaks the sender audio message corresponding to the text message, the animated entity exhibits actions associated with a respective one of the at least one emoticon beginning at a point corresponding to a first predetermined amount of time before the respective one of the at least one emoticon and ending at a second point corresponding to a second predetermined amount of time after the respective one of the at least one emoticon, and the first predetermined amount of time and the second predetermined amount of time are defined based, at least partly, on words surrounding the respective one of the at least one emoticon.

8. The method of sending a multi-media message of claim 7, wherein the multi-media message is sent over the Internet.

9. The method of sending a multi-media message of claim 7, wherein the multi-media message is sent in an instant message.

10. The method of sending a multimedia message of claim 7, wherein the multi-media message is sent over a wireless network.

11. The method of claim 7, wherein the first predetermined amount of time and the second predetermined amount of time are further defined based, at least partly, on the respective one of the at least one emoticon.

12. A method of providing a synthesized voice with sender voice characteristics, the method comprising:

receiving an audio recording, associated with a message, from a sender;

after receiving the audio recording, using an automatic speech recognizer and presenting a text message corresponding to the audio recording to the sender;

permitting the sender to insert at least one emoticon into the text message;

parameterizing the audio recording into audio parameters; and using the audio parameters, synthesizing a voice that is not the sender's voice but includes at least one sender voice characteristic for delivery of the message with an animated entity speaking the message corresponding to the text message, with the synthesized voice, wherein:

when the animated entity speaks the message the animated entity exhibits actions associated with a respective one of the at least one emoticon beginning at a point corresponding to a first predetermined amount of time before the respective one of the at least one emoticon and ending at a second point corresponding to a second predetermined amount of time after the respective one of the at least one emoticon, and the first predetermined amount of time and the second predetermined amount of time are defined based, at least partly on words surrounding the respective one of the at least one emoticon.

13. The method of providing a synthesized voice with sender voice characteristics of claim 12, wherein the at least one sender voice characteristic is one of an accent, voice inflection, pitch, rhythm, or dialect.

14. The method of providing a synthesized voice with sender voice characteristics of claim 12, wherein parameterizing the audio recording into audio parameters further comprises using an alignment program for segmenting the audio recording into phonemes and labeling the audio recording with the phonemes, duration, pitch, stress and other parameters.

15. The method of claim 12, wherein the first predetermined amount of time and the second predetermined amount of time are further defined based, at least partly, on the respective one of the at least one emoticon.

* * * * *